United States Patent
Takahashi et al.

(10) Patent No.: US 12,341,881 B2
(45) Date of Patent: Jun. 24, 2025

(54) QUANTUM CRYPTOGRAPHY COMMUNICATION SYSTEM, QUANTUM CRYPTOGRAPHY COMMUNICATION DEVICE, KEY MANAGEMENT DEVICE, AND COMPUTER PROGRAM PRODUCT

(71) Applicant: KABUSHIKI KAISHA TOSHIBA, Tokyo (JP)

(72) Inventors: Ririka Takahashi, Tokyo (JP); Yoshimichi Tanizawa, Yokohama Kanagawa (JP); Alexander Dixon, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 466 days.

(21) Appl. No.: 17/652,380

(22) Filed: Feb. 24, 2022

(65) Prior Publication Data
US 2023/0084881 A1 Mar. 16, 2023

(30) Foreign Application Priority Data
Sep. 16, 2021 (JP) .................. 2021-151591

(51) Int. Cl.
*H04L 9/08* (2006.01)
(52) U.S. Cl.
CPC .......... *H04L 9/0858* (2013.01); *H04L 9/0819* (2013.01); *H04L 9/0869* (2013.01)
(58) Field of Classification Search
USPC ........................................................ 380/278
See application file for complete search history.

(56) References Cited

U.S. PATENT DOCUMENTS

2005/0078826 A1  4/2005  Takeuchi
2013/0083926 A1* 4/2013  Hughes ................. H04L 9/3247
                                                        380/278
(Continued)

FOREIGN PATENT DOCUMENTS

JP   2005-117511 A   4/2005
JP   2015-179974 A   10/2015
(Continued)

OTHER PUBLICATIONS

C. Kollmitzer, M. Pivk (Eds.), "Applied Quantum Cryptography," Lecture Notes in Physics 797, (Springer, Berlin Heidelberg), Foreword, Acknowledgements, and Table of Contents (2010).
M. Dianati et al., "Architecture and protocols of the future European quantum key distribution network," Security and Communication Networks, 1:57-74, DOI: 10.1002/sec. 13 (2008).
(Continued)

*Primary Examiner* — Sanchit K Sarker
(74) *Attorney, Agent, or Firm* — Finnegan, Henderson, Farabow, Garrett & Dunner, LLP

(57) ABSTRACT

According to an embodiment, a quantum cryptography communication system includes a quantum cryptography communication device and a key management device. The quantum cryptography communication system includes a generated information supply unit, a reception unit, a determination unit, and a global key supply unit. The generated information supply unit is configured to supply generated information generated by quantum key distribution processing, to the key management device. The reception unit is configured to receive the generated information from the quantum cryptography communication device. The determination unit is configured to determine a ratio at which the generated information is used for a global key random number for each encrypted data communication destination. The global key supply unit is configured to supply a global key generated from the global key random number to an application connected to the key management device.

10 Claims, 13 Drawing Sheets

(56) References Cited

U.S. PATENT DOCUMENTS

| | | | |
|---|---|---|---|
| 2013/0101121 A1* | 4/2013 | Nordholt | H04L 9/0852 380/279 |
| 2015/0270963 A1* | 9/2015 | Tanizawa | H04L 9/0852 713/171 |
| 2016/0099813 A1* | 4/2016 | Suryavanshi | H04L 9/088 713/175 |
| 2016/0269177 A1 | 9/2016 | Tanizawa | |
| 2016/0285629 A1 | 9/2016 | Tanizawa | |
| 2018/0006813 A1 | 1/2018 | Van Der Leest et al. | |
| 2018/0054304 A1* | 2/2018 | Tanizawa | H04L 9/0827 |
| 2018/0062837 A1 | 3/2018 | Tanizawa | |
| 2019/0260581 A1 | 8/2019 | Su et al. | |
| 2022/0141008 A1* | 5/2022 | Lim | H04L 9/0855 380/278 |

FOREIGN PATENT DOCUMENTS

| | | |
|---|---|---|
| JP | 2016-171530 A | 9/2016 |
| JP | 2018-504827 A | 2/2018 |
| JP | 2018-37888 A | 3/2018 |
| JP | 2021-10179 A | 1/2021 |

OTHER PUBLICATIONS

M. Lucamarini et al., "Efficient decoy-state quantum key distribution with quantified security," Optics Express, vol. 21, No. 21, pp. 24550-24565 (2013).

Japan Patent Office, Decision to Grant a Patent in JP App. No. 2021-151591 2 pages, and machine translation, 2 pages (Jun. 11, 2024).

* cited by examiner

QUANTUM CRYPTOGRAPHY COMMUNICATION SYSTEM, QUANTUM CRYPTOGRAPHY COMMUNICATION DEVICE, KEY MANAGEMENT DEVICE, AND COMPUTER PROGRAM PRODUCT

CROSS-REFERENCE TO RELATED APPLICATIONS

This application is based upon and claims the benefit of priority from Japanese Patent Application No. 2021-151591, filed on Sep. 16, 2021; the entire contents of which are incorporated herein by reference.

FIELD

Embodiments described herein relate generally to a quantum cryptography communication system, a quantum cryptography communication device, a key management device, and a computer program product.

BACKGROUND

A technology, quantum key distribution (QKD), of securely sharing an encryption key using a single photon successively transmitted between a transmission device and a reception device connected by an optical fiber is conventionally known.

DETAILED DESCRIPTION

According to an embodiment, a quantum cryptography communication system includes a quantum cryptography communication device and a key management device. The quantum cryptography communication system includes a generated information supply unit, a reception unit, a determination unit, and a global key supply unit. The generated information supply unit is configured to supply generated information generated by quantum key distribution processing, to the key management device. The reception unit is configured to receive the generated information from the quantum cryptography communication device. The determination unit is configured to determine a ratio at which the generated information is used for a global key random number for each encrypted data communication destination. The global key supply unit is configured to supply a global key generated from the global key random number to an application connected to the key management device.

Hereinafter, embodiments of a quantum cryptography communication system, a quantum cryptography communication device, a key management device, and a program will be described in detail with reference to the accompanying drawings.

First Embodiment

First, quantum key distribution (QKD) will be described. Quantum Key Distribution (QKD)

An encryption key shared by quantum key distribution (QKD) is ensured not to be eavesdropped on the basis of the principles of quantum mechanics. It is ensured by an information theory that encrypted data communication by a one-time pad using an encryption key shared by QKD cannot be deciphered even by a eavesdropper having whatever knowledge. Here, when a transmitting node and a receiving node are collectively referred to as nodes, and a function of performing encrypted data communication using a shared encryption key is referred to as an application (hereinafter, the application is referred to as an "application"), it is possible to configure a quantum key distribution system as illustrated in FIG. 1.

Figure 1:
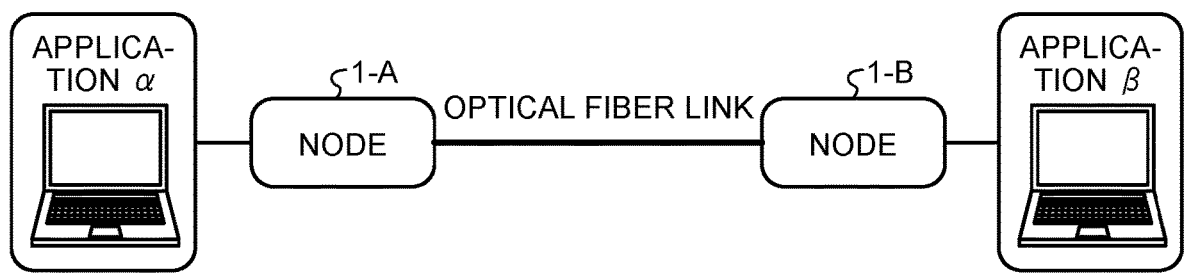
FIG. 1 is a diagram illustrating an example of a basic configuration of a quantum key distribution system according to a first embodiment.

FIG. 1 is a diagram illustrating an example of a basic configuration of a quantum key distribution system. In the example of FIG. 1, encryption keys shared between a node 1-A and a node 1-B are supplied to applications α and β, respectively. Thereafter, the application α and the application β encrypt data using the supplied encryption keys and perform encrypted data communication. However, the method of sharing the encryption key by QKD has a limitation on the distance with which the encryption key can be shared due to the use of a single photon as a medium.

Example of Quantum Cryptography Communication System

Figure 2:
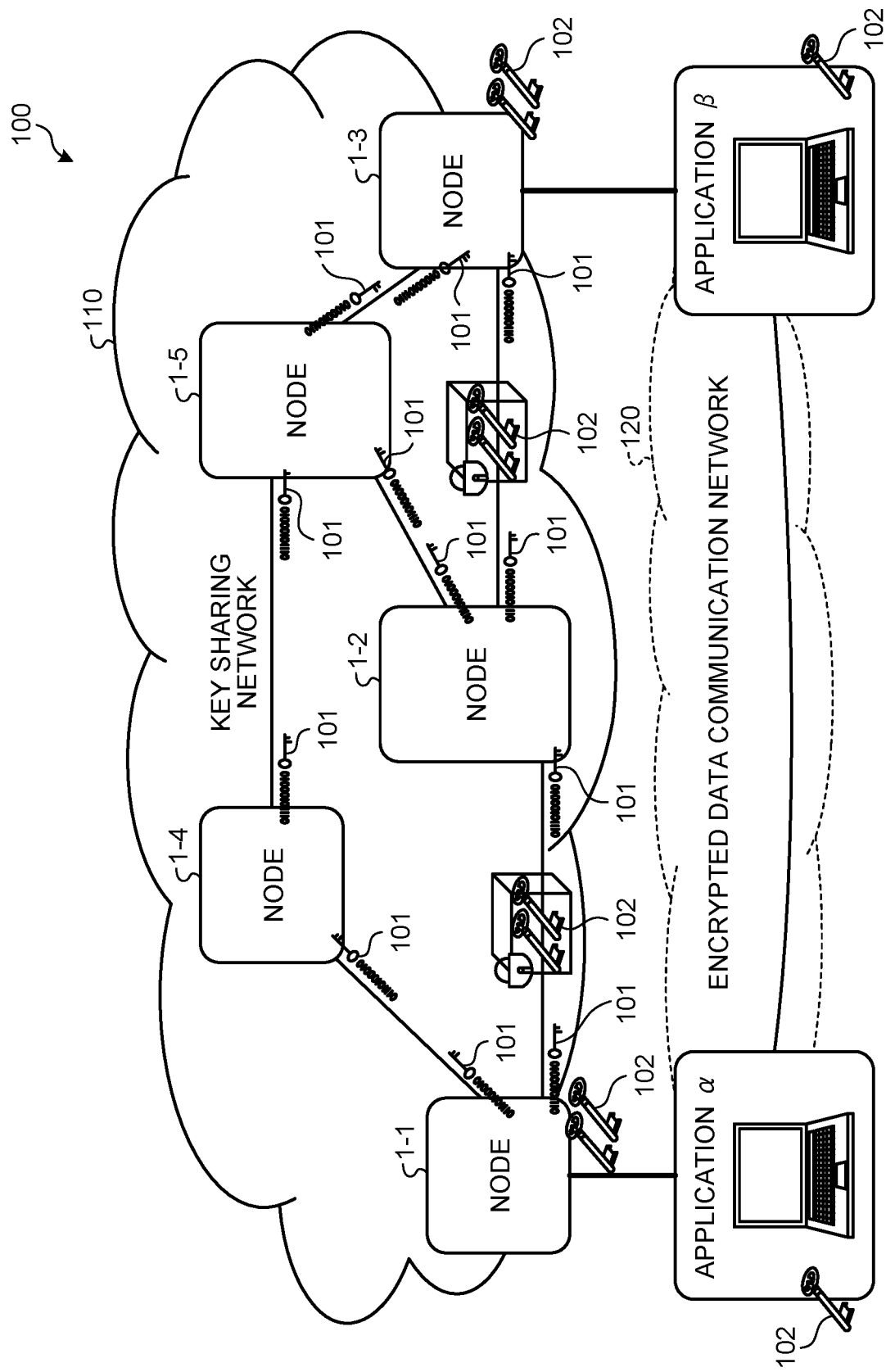
FIG. 2 is a diagram illustrating an example of a quantum cryptography communication system according to the first embodiment.

FIG. 2 is a diagram illustrating an example of a quantum cryptography communication system 100 according to the first embodiment. The quantum cryptography communication system 100 of the first embodiment includes a key sharing network 110 and an encrypted data communication network 120.

In the key sharing network (QKD network) 110, nodes 1-1 to 1-5 having a plurality of functions of a transmitting node and a receiving node are connected to each other by an optical fiber link. For example, the node 1-1 has functions of the transmitting node and the receiving node respectively in communication between the node 1-1 and the node 1-2 and communication between the node 1-1 and the node 1-4.

Hereinafter, in a case where the nodes 1-1 to 1-5 are not distinguished, they are simply referred to as a node 1.

Here, the nodes 1-1 to 1-5 are connected by an optical fiber link and share an encryption key by QKD. Here, an encryption key shared by QKD between the nodes 1 connected by the optical fiber link is referred to as a local key 101.

Furthermore, the node 1 generates another encryption key (this will be referred to as a global key 102), encrypts the global key 102 with the local key 101, and transfers the encrypted key to the adjacent node 1. Note that details of a method of generating the global key 102 according to the first embodiment will be described later.

The node 1 shares the global key 102 with any node 1 on the key sharing network 110 by repeating the above-described process of encrypting the global key 102 with the local key 101 and transferring the global key 102. At this time, the global key 102 is transferred on the link in a state of being encrypted by the local key 101 shared by QKD. Therefore, assuming the safety of the node 1 itself, it can be said that the safety of the global key 102 is ensured similarly to the local key 101.

On the other hand, the applications α and β that perform encrypted data communication are accommodated in the encrypted data communication network 120. The applications α and β perform encrypted data communication using the global key 102 shared between the applications α and β. In the example of FIG. 2, the global key 102 used by the application α is supplied by the node 1-1 communicatively connected to the application α. The global key 102 used by the application β is supplied by the node 1-3 communicatively connected to the application β.

Example of Global Key Supply Processing

Figure 3:
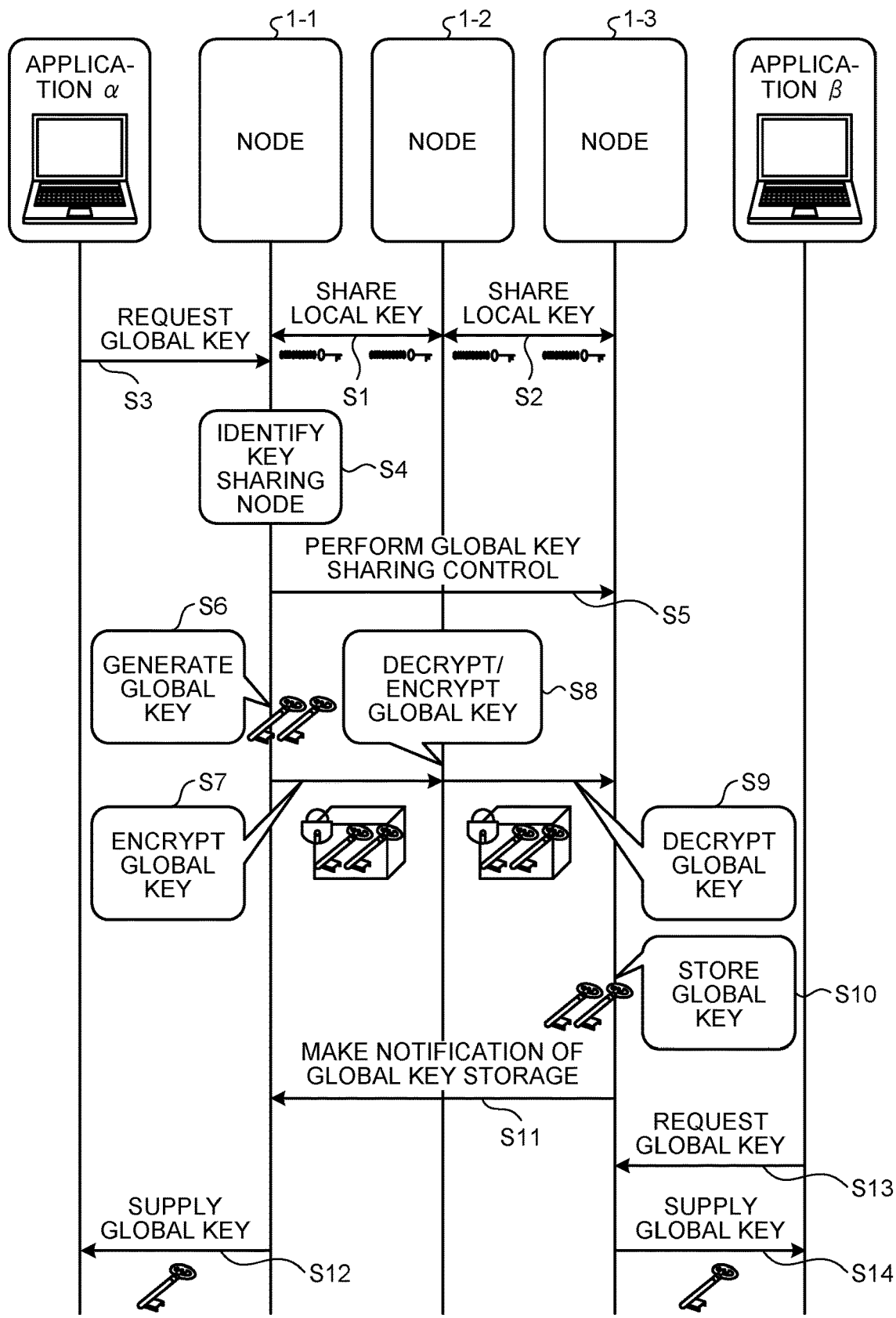
FIG. 3 is a sequence diagram illustrating an example of global key supply processing according to the first embodiment.

FIG. 3 is a sequence diagram illustrating an example of global key supply processing according to the first embodiment. First, the local key 101 by QKD is shared between the node 1-1 and the node 1-2 (step S1). Next, the local key 101 by QKD is shared between the node 1-2 and the node 1-3 (step S2).

Next, the application α transmits a global key request to the node 1 (step S3). The global key request indicates a request for the global key 102 used for encrypted data communication with the application β.

Next, the node 1-1 identifies the node 1-3 connected to the application β communicating with the application α (step S4).

Next, the node 1-1 starts global key sharing control with the node 1-3 (step S5). Specifically, the node 1-1 transmits a notification indicating a request for processing of sharing the global key to the node 1-3.

Next, the node 1-1 generates the global key 102 (step S6), encrypts the global key 102 with the local key 101, and transfers the encrypted global key to the node 1-2 (step S7).

The node 1-2 decrypts the encrypted global key 102 with the local key 101 shared with the node 1-1, encrypts the decrypted global key 102 with the local key 101 shared with the node 1-3, and transfers the encrypted global key to the node 1-3 (step S8).

Next, upon receiving the encrypted global key 102, the node 1-3 decrypts the received global key with the local key 101 shared with the node 1-2 (step S9), and stores the decrypted global key 102 in a storage or the like (step S10). Next, the node 1-3 transmits a global key storage notification indicating that the global key 102 has been stored to the node 1-1 (step S11).

According to the above processing procedure, the node 1-1 and the node 1-3 share the global key 102. Thereafter, the node 1-1 supplies the global key 102 to the application α (step S12). Upon receiving the global key request from the application β (step S13), the node 1-3 supplies the global key 102 stored in step S10 to the application β (step S13).

By the global key supply processing as illustrated in FIG. 3 described above, the applications α and β can share the same encryption key (global key 102). Thereafter, the applications α and β can perform secure encrypted data communication via the encrypted data communication network 120.

The encryption key sharing method in which the local key 101 and the global key 102 are combined as described above can overcome the limitation on the distance with which the encryption key can be shared due to the use of QKD. In addition, this method in which the node 1-1 connected to the application α and the node 1-3 connected to the application β control generation, sharing, and routing of the encryption key (global key 102) can be realized by simple components by utilizing existing network technologies. In order to realize this, a key management device (KM) is used. The key management device (KM) is generally an independent server and has functions such as holding, relaying and supplying of an encryption key.

Local Keys for Encryption and Decryption

In QKD, since encrypted data communication using a common encryption key is performed, it is required to have the same key between the nodes 1 communicably connected to an application that performs the encrypted data communication. If the same key is held, the local key 101 shared by QKD may be stored in a storage or the like separately a key for encryption and a key for decryption.

The local key 101 is shared between the adjacent nodes 1 by QKD, but the key stored as the local key 101 for encryption in one node 1 is stored as the local key 101 for decryption in the adjacent opposite node 1. Conversely, the key stored as the local key 101 for decryption in one node 1 is stored as the local key 101 for encryption in the adjacent opposite node 1.

That is, the local key 101 for encryption of one node 1 is the same as the local key 101 for decryption of the adjacent opposite node 1, and the local key 101 for decryption of one node 1 is the same as the local key 101 for encryption of the adjacent opposite node 1.

Then, the local key 101 is used for encryption and decryption when data is transferred to the adjacent node 1. By storing the local key 101 separately the local key for encryption and the local key for decryption in a storage or the like, the node 1 selectively uses the local key 101 for encryption and the local key 101 for decryption according to a communication direction of data.

The node 1 that transmits data encrypts the data using the local key 101 for encryption, and the node 1 that receives data decrypts the data using the local key 101 for decryption. The node 1 encrypts or decrypts data by selectively using the local key 101 for encryption and the local key 101 for decryption according to the data transmission direction as described above. Therefore, the node 1 may prepare both the local keys 101 for encryption and decryption in order to perform bidirectional communication.

Global Keys for Encryption and Decryption

In general, the global key 102 is generated regardless of QKD and is encrypted using the local key 101 to be shared with the adjacent node 1. The global key 102 is supplied to the applications α and β for encrypted data communication using a common key (for example, encrypted data communication such as a one-time pad). The node 1 may also store the global key 102 in a storage or the like separately a key for encryption and a key for decryption.

For example, in a case where the node 1-1 supplies the global key 102 for performing encrypted data communication from the application α to the application β, the global key 102 for encryption is supplied from the node 1-1 to the application α that transmits data communication. Then, the node 1-3 supplies the global key 102 for decryption to the application β that receives the encrypted data communication. At this time, the global key 102 for encryption is the same key as the global key 102 for decryption. That is, the global key 102 for encryption of the node 1-1 is shared as the global key 102 for decryption of the node 1-3.

In this manner, the global key 102 for encryption is supplied to the application α that transmits the encrypted data communication, and the global key 102 for decryption is supplied to the application β that receives the encrypted data communication. Note that the similar applies to a case where encrypted data communication is performed from the application β to the application α. That is, similar to the above description, the global key 102 for encryption is supplied to the application β that transmits the encrypted data communication, and the global key 102 for decryption is supplied to the application α that receives the encrypted data communication.

For the applications α and β, it is possible to receive the global key 102 same as the opposite communication destination and perform encrypted data communication without being conscious of the key for encryption and the key for decryption.

Hereinafter, a functional configuration and an operation of the node 1 according to the first embodiment will be described.

As described above, in the key sharing network (QKD network) 110, it is required to generate the encryption key (global key 102) to be supplied to the applications α and β separately from the encryption key (local key 101) generated by quantum key distribution processing. The global key 102 is shared with a communication destination by being relayed via an optical fiber link in the key sharing network (QKD network) 110. However, there may be a case where the key management device (KM) of each node 1 is not provided with a random number generator for generating the global key 102 due to a limitation on the system configuration or the like. Therefore, even in a system configuration in which the key management device (KM) does not include a random number generator, in a case where a QKD network can be configured, it is possible to configure the system more flexibly and make the entire system configuration efficient.

In the first embodiment, a case where a part of the encryption key (local key 101) generated by the quantum cryptography communication device of each node 1 is used as the encryption key (global key 102) will be described. According to the first embodiment, it is possible to construct the key sharing network (QKD network) 110 even in a case where the key management device (KM) does not include a random number generator.

Example of Functional Configuration

The node 1 of the first embodiment includes a quantum cryptography communication device and a key management device. The quantum cryptography communication device and the key management device may be provided in the same housing or may be communicably connected to each other as separate devices.

Figure 4:
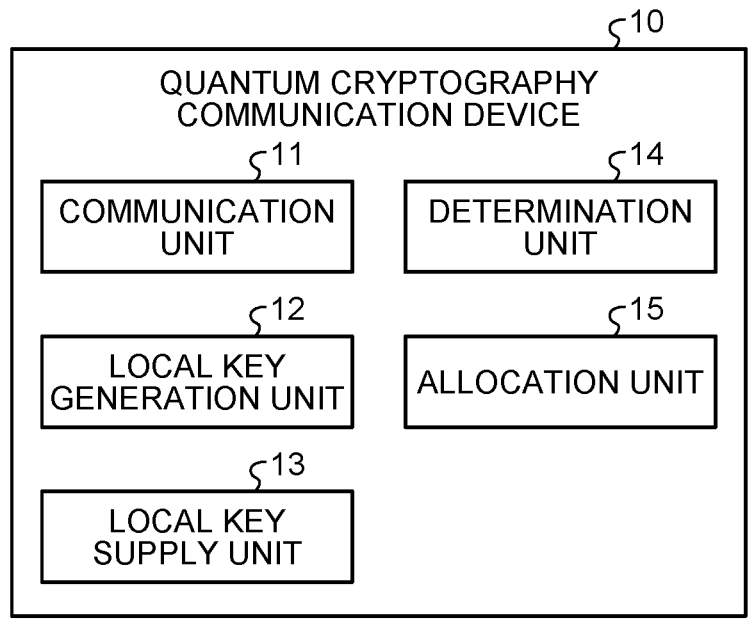
FIG. 4 is a diagram illustrating an example of a functional configuration of a quantum cryptography communication device according to the first embodiment.

FIG. 4 is a diagram illustrating an example of a functional configuration of a quantum cryptography communication device 10 according to the first embodiment. The quantum cryptography communication device 10 of the first embodiment includes a communication unit 11, a local key generation unit 12, a local key supply unit 13, a determination unit 14, and an allocation unit 15.

The communication unit 11 communicates with an opposite quantum cryptography communication device 10 connected by an optical fiber link. The communication unit 11 includes both a quantum communication interface (IF) for exchanging quanta by quantum key distribution and a classical communication IF for controlling the quantum cryptography communication device 10 and generating a key.

The local key generation unit 12 (an example of a generated information generation unit) performs quantum communication or classical communication with the opposite quantum cryptography communication device 10 via the communication unit 11 to generate a common local key 101 (an example of generated information generated by the quantum key distribution processing).

A local key supply unit 13 (an example of a generated information supply unit) supplies a local key 101 generated by quantum key distribution to an object that uses the local key 101 such as a key management device (KM) 20. A part of the local key 101 generated by quantum key distribution is supplied to a key management device (KM) 20 as a global key random number.

The determination unit 14 determines a ratio at which the local key 101 is allocated to the local key 101 for encryption, the local key 101 for decryption, and the global key random number for each encrypted data communication destination. Then, the determination unit 14 notifies the allocation unit 15 of the local key 101 and the allocation ratio of the local key 101. For example, the allocation ratio of the local key 101 may be determined by the quantum cryptography communication device 10 itself or may be determined together with the opposite quantum cryptography communication device 10 by notification or the like from the key management device (KM) 20.

The allocation unit 15 allocates the local key 101 to the local key 101 for encryption, the local key 101 for decryption, and the global key random number for each encrypted data communication destination according to the allocation determined by the determination unit 14 described above.

Note that the above-described processing by the determination unit 14 may be performed by a determination unit 25 (see FIG. 5) of the key management device (KM) 20. The above-described processing by the allocation unit 15 may be performed by an allocation unit 26 (see FIG. 5) of the key management device (KM) 20.

Figure 5:
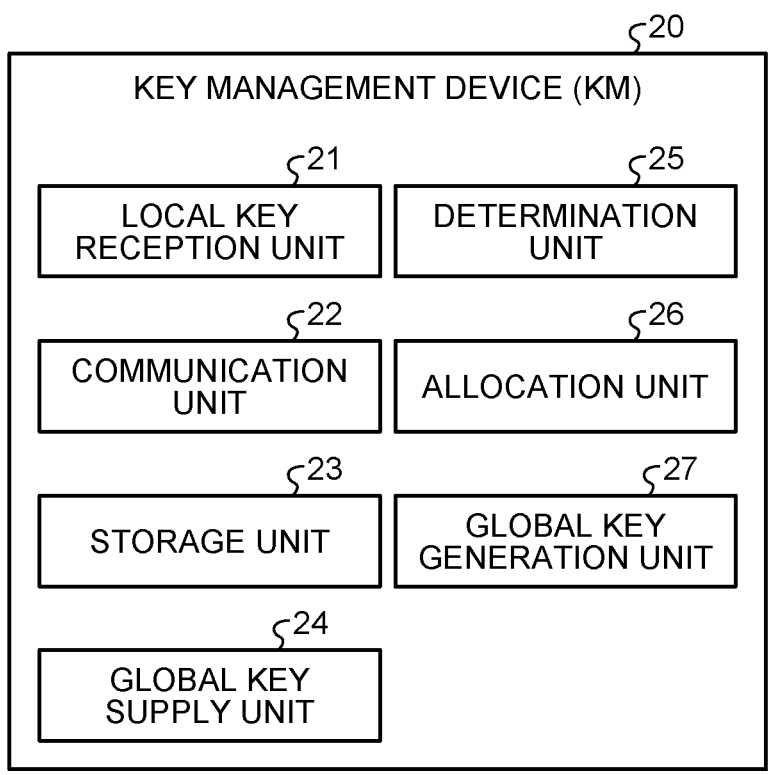
FIG. 5 is a diagram illustrating an example of a functional configuration of a key management device according to the first embodiment.

FIG. 5 is a diagram illustrating an example of a functional configuration of the key management device (KM) 20 according to the first embodiment. The key management device (KM) 20 according to the first embodiment includes a local key reception unit 21, a communication unit 22, a storage unit 23, a global key supply unit 24, a determination unit 25, an allocation unit 26, and a global key generation unit 27.

The local key reception unit 21 receives the local key 101 supplied from the quantum cryptography communication device 10.

The communication unit 22 performs communication for performing a key management function that operates in the key management device (KM) 20, communication for receiving the local key 101 from the quantum cryptography communication device 10, communication for supplying the global key 102 to applications α and β that perform encrypted data communication, and the like.

The storage unit 23 stores a key (the local key 101) supplied from the quantum cryptography communication device 10 and the global key 102 to be supplied to the applications α and β.

The global key supply unit 24 supplies the global key 102 to the applications α and β that perform encrypted data communication.

The determination unit 25 determines a ratio at which the local key 101 received from the quantum cryptography communication device 10 is allocated to the local key 101 for encryption, the local key 101 for decryption, and the global key random number for each encrypted data communication destination. In addition, the determination unit 25 determines the key management device 20 of the node 1 sharing the global key 102, and determines, with the node 1, the ratio of the global key random number allocated to the global key 102 shared with the key management device 20.

The allocation unit 26 allocates the local key 101 supplied from the quantum cryptography communication device 10 to the local key 101 for encryption, the local key 101 for decryption, and the global key random number for each encrypted data communication destination according to the allocation determined by the determination unit 25 described above.

The global key generation unit 27 generates the global key 102 based on the local key 101 allocated as the global key random number for each encrypted data communication destination received from the quantum cryptography communication device 10.

Note that the above-described processing by the determination unit 25 may be performed by the determination unit 14 (see FIG. 4) of the quantum cryptography communication device 10. The above-described processing by the allocation unit 26 may be performed by the allocation unit 15 (see FIG. 4) of the quantum cryptography communication device 10.

Example of Method of Transferring Global Key

Figure 6:
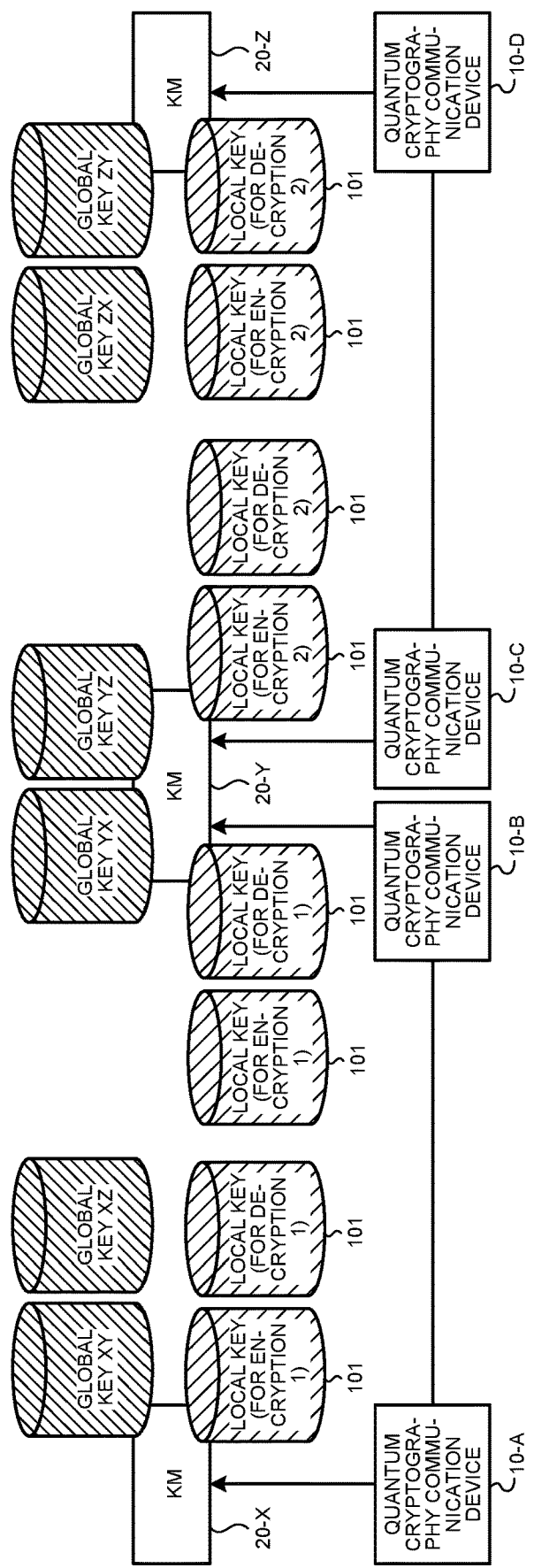
FIG. 6 is a diagram illustrating an example of a method of transferring a global key according to the first embodiment.

FIG. 6 is a diagram illustrating an example of a method of transferring the global key 102 according to the first embodiment. The quantum cryptography communication device 10-A and the quantum cryptography communication device 10-B are connected by an optical fiber link and perform QKD to generate the common local key 101. Similarly, the quantum cryptography communication device 10-C and the quantum cryptography communication device 10-D perform QKD to generate the other local key 101.

In the following description, the key management device 20 will be abbreviated as the KM 20.

The local key 101 generated by the quantum cryptography communication device 10-A is transmitted to the KM 20-X, and the local key 101 generated by the quantum cryptography communication device 10-B is transmitted to the KM 20-Y. At this time, the local keys 101 generated by the quantum cryptography communication device 10-A and the quantum cryptography communication device 10-B are the same. Specifically, the local key 101 (for encryption 1) of KM 20-X and the local key 101 (for decryption 1) of KM 20-Y are the same, and the local key 101 (for decryption 1) of KM 20-X and the local key 101 (for encryption 1) of KM 20-Y are the same.

Similarly, the local key 101 generated by the quantum cryptography communication device 10-C is transmitted to the KM 20-Y, and the local key 101 generated by the quantum cryptography communication device 10-D is transmitted to the KM 20-Z. At this time, the local keys 101 generated by the quantum cryptography communication device 10-C and the quantum cryptography communication device 10-D are also the same. Specifically, the local key 101 (for encryption 2) of KM 20-Y and the local key 101 (for decryption 2) of KM 20-Z are the same, and the local key 101 (for decryption 2) of KM 20-Y and the local key 101 (for encryption 2) of KM 20-Z are the same.

The KM 20-X generates a global key XY shared with the KM 20-Y and a global key XZ shared with the KM 20-Z as encryption keys different from the local key 101. Here, symbol M of the global key MN represents a suffix of the KM-20 that has generated the global key 102, and symbol N represents a suffix of the KM-20 as a destination that the global key is transferred and shared. Note that a method of generating the global key MN will be described later in detail with reference to FIG. 7.

The KM 20-X encrypts the global key XY generated by the KM 20-X using the local key 101 (for encryption 1) of the KM 20-X and transfers the encrypted global key XY to the KM 20-Y. The KM 20-Y decrypts the encrypted global key XY using the local key 101 (for decryption 1) to acquire the global key XY common to the KM 20-X.

Furthermore, the KM 20-X first encrypts the global key XZ generated by the KM 20-X using the local key 101 (for encryption 1) of the KM 20-X and transfers the encrypted global key XZ to the KM 20-Y. The KM 20-Y decrypts the encrypted global key XZ using the local key 101 (for decryption 1), further encrypts the decrypted global key XZ using the local key 101 (for encryption 2) of the KM 20-Y, and transfers the encrypted global key XZ to the KM 20-Z. The KM 20-Z decrypts the encrypted global key XZ using the local key 101 (for decryption 2) to acquire the global key XZ common to the KM 20-X.

Similarly, the KM 20-Y generates a global key YX shared with the KM 20-X and a global key YZ shared with the KM 20-Z. The KM 20-Y encrypts the global key YX generated by the KM 20-Y using the local key 101 (for encryption 1) of the KM 20-Y and transfers the encrypted global key YX to the KM 20-X. The KM 20-X decrypts the encrypted global key YX using the local key 101 (for decryption 1) to acquire the global key YX common to the KM 20-Y. Furthermore, the KM 20-Y first encrypts the global key YZ generated by the KM 20-Y using the local key 101 (for encryption 2) of the KM 20-Y and transfers the encrypted global key YZ to the KM 20-Z. The KM 20-Z decrypts the encrypted global key YZ using the local key 101 (for decryption 2) to acquire the global key YZ common to the KM 20-Y.

Similarly, the KM 20-Z generates a global key ZX shared with the KM 20-X and a global key ZY shared with the KM 20-Y. The KM 20-Z first encrypts the global key ZX generated by the KM 20-Z using the local key 101 (for encryption 2) of the KM 20-Z and transfers the encrypted global key ZX to the KM 20-Y. The KM 20-Y decrypts the encrypted global key ZX using the local key 101 (for decryption 2), further encrypts the decrypted global key ZX using the local key 101 (for encryption 1) of the KM 20-Y, and transfers the encrypted global key ZX to the KM 20-X. The KM 20-X decrypts the encrypted global key ZX using the local key 101 (for decryption 1) to acquire the global key ZX common to the KM 20-Z.

Furthermore, the KM 20-Z encrypts the global key ZY generated by the KM 20-Z using the local key 101 (for encryption 2) of the KM 20-Z and transfers the encrypted global key ZY to the KM 20-Y. The KM 20-Y decrypts the encrypted global key ZY using the local key 101 (for decryption 2) to acquire the global key ZX common to the KM 20-Z.

In this manner, the global key 102 can be shared between the nodes 1 (the quantum cryptography communication device 10 and the KM 20) using the local key 101 (for encryption 1) and the local key 101 (for decryption 1) shared between the quantum cryptography communication devices 10-A and 10-B that are opposite to each other, and the local key 101 (for encryption 2) and the local key 101 (for decryption 2) shared between the quantum cryptography communication devices 10-C and 10-D that are opposite to each other.

Example of Method of Generating Global Key

Figure 7:
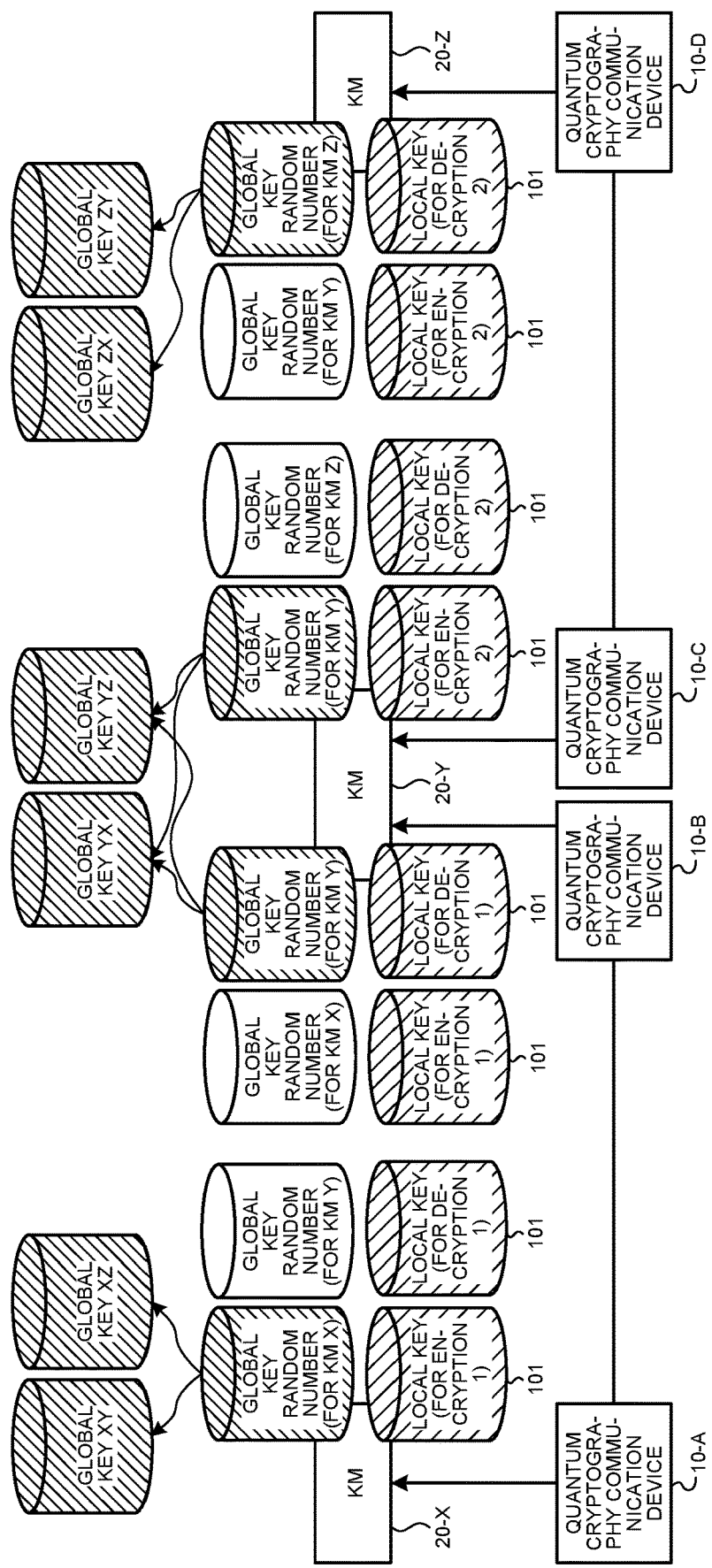
FIG. 7 is a diagram illustrating an example of a method of generating a global key according to the first embodiment.

FIG. 7 is a diagram illustrating an example of a method of generating the global key 102 according to the first embodiment. The local key 101 generated by the quantum cryptography communication device 10-A is transmitted to the KM 20-X, and the local key 101 generated by the quantum cryptography communication device 10-B is transmitted to the KM 20-Y.

The KM 20-X allocates the local key 101 received from the quantum cryptography communication device 10-A among the local key 101 (for encryption 1), the local key 101 (for decryption 1), the global key random number (for KM X), and the global key random number (for KM Y).

Here, the global key random number (for KM X) is used to generate the global key 102 in the KM 20-X. The global key random number (for KM Y) is used to generate the global key 102 in the KM 20-Y.

The KM 20-Y allocates the local key 101 received from the quantum cryptography communication device 10-B among the local key 101 (for decryption 1), the local key 101 (for encryption 1), the global key random number (for KM X), and the global key random number (for KM Y).

At this time, the global key random number (for KM X) of KM 20-X and the global key random number (for KM X) of KM 20-Y are the same, and the global key random number (for KM Y) of KM 20-X and the global key random number (for KM Y) of KM 20-Y are the same.

Similarly, the local key 101 generated by the quantum cryptography communication device 10-C is transmitted to the KM 20-Y, and the local key 101 generated by the quantum cryptography communication device 10-D is transmitted to the KM 20-Z.

The KM 20-Y allocates the local key 101 received from the quantum cryptography communication device 10-C among the local key 101 (for encryption 2), the local key 101 (for decryption 2), the global key random number (for KM Y), and the global key random number (for KM Z).

Here, the global key random number (for KM Y) is used to generate the global key 102 in the KM 20-Y. The global key random number (for KM Z) is used to generate the global key 102 in the KM 20-Z.

The KM 20-Z allocates the local key 101 received from the quantum cryptography communication device 10-D among the local key 101 (for decryption 2), the local key 101 (for encryption 2), the global key random number (for KM Y), and the global key random number (for KM Z).

At this time, the global key random number (for KM Y) of KM 20-Y and the global key random number (for KM Y) of KM 20-Z are the same, and the global key random number (for KM Z) of KM 20-Y and the global key random number (for KM Z) of KM 20-Z are the same.

The KM 20-X generates the global key XY shared with the KM 20-Y and a global key XZ shared with the KM 20-Z from the global key random number (for KM X) of the KM 20-X. Here, note that the global key random number (for KM Y) of KM 20-X is not used by KM 20-X since it is used to generate global key 102 of KM 20-Y.

The KM 20-X transfers the global key XY generated by the KM 20-X to the KM 20-Y by the transfer method in FIG. 6 described above. Furthermore, the KM 20-X transfers the global key XZ generated by the KM 20-X to the KM 20-Z by the transfer method in FIG. 6 described above.

The KM 20-Y generates the global key YX shared with the KM 20-X and a global key YZ shared with the KM 20-Z from the global key random number (for KM Y) of the KM 20-Y. Here, note that the global key random number (for KM X) of the KM 20-Y is not used by the KM 20-Y since it is used to generate the global key 102 of the KM 20-X, and the global key random number (for KM Z) of the KM 20-Y is not used by KM 20-Y since it is used to generate the global key 102 of the KM 20-Z. In addition, for the generation of the global key 102, both of or either one of the global key random number (for KM Y) shared with the KM 20-X and the global key random number (for KM Y) shared with the KM 20-Z may be used.

The KM 20-Y transfers the global key YX generated by the KM 20-Y to the KM 20-X by the transfer method in FIG. 6 described above. Furthermore, the KM 20-Y transfers the global key YZ generated by the KM 20-Y to the KM 20-Z by the transfer method in FIG. 6 described above.

The KM 20-Z generates the global key ZX shared with the KM 20-X and the global key ZY shared with the KM 20-Y from the global key random number (for KM Z) of the KM 20-Z. Here, note that the global key random number (for KM Y) of KM 20-Z is not used by KM 20-Z since it is used to generate global key 102 of KM 20-Y.

The KM 20-Z transfers the global key ZX generated by the KM 20-Z to the KM 20-X by the transfer method in FIG. 6 described above. Furthermore, the KM 20-Z transfers the global key ZY generated by the KM 20-Z to the KM 20-Y by the transfer method in FIG. 6 described above.

Example of Determining Allocation Ratio

As described above with reference to FIG. 7, for example, the KM 20-X allocates the local key 101 received from the quantum cryptography communication device 10-A among the local key 101 (for encryption 1), the local key 101 (for decryption 1), the global key random number (for KM X), and the global key random number (for KM Y).

There is a method in which the ratio to be allocated to each component is determined by the determination unit 25 of the KM 20-X and the communication unit 22 of the KM 20-X notifies the KM 20-Y and KM 20-Z of the ratio determined by the KM 20-X. At this time, the determination unit 25 of the KM 20-X also determines the assignment (in FIG. 7, the global keys XY and XZ) of the global key 102 generated from the global key random number (for KM-X).

In addition, for example, the determination unit 25 of the KM 20-X may determine the ratio of the global keys XY and XZ according to a request from an application that performs encrypted data communication using the global key XY or XZ. For example, the request from the application includes information such as a generation ratio or the like of the global keys XY and XZ determined according to the use frequency or the like of the global keys XY and XZ. For example, in a case where the generation ratio of the global keys XY and XZ is 2:1, the determination unit 25 determines the ratio of the global keys XY and XZ such that the generation amount of the global key XY is twice the generation amount of the global key XZ.

In addition, for example, the determination unit 14 of the quantum cryptography communication device 10-A may determine the ratio to be allocated to each of the local key 101 (for encryption 1), the local key 101 (for decryption 1), the global key random number (for KM X), and the global key random number (for KM Y) in cooperation with the opposite quantum cryptography communication device 10-B.

In addition, for example, the determination unit 14 of the quantum cryptography communication device 10-A may receive a notification or the like indicating the ratio to be allocated to each of the local key 101 (for encryption 1), the local key 101 (for decryption 1), the global key random number (for KM X), and the global key random number (for KM Y) from the KM 20-X and perform the determination based on the notification in cooperation with the opposite quantum cryptography communication device 10-B.

In addition, for example, the determination unit 14 of the quantum cryptography communication device 10-A may determine the ratio to be allocated to each of the local key 101 (for encryption 1), the local key 101 (for decryption 1), the global key random number (for KM X), and the global key random number (for KM Y) according to the speed at which the quantum cryptography communication device 10-A generates the local key 101.

In addition, for example, in the KM 20, such as the KM 20-Y, to which the plurality of quantum cryptography communication devices 10 (10-B and 10-C), information on a generation speed of the local key 101 of the quantum cryptography communication device 10-B and the quantum cryptography communication device 10-C connected to the KM 20 may be shared to determine which local key 101 is allocated to the global key random number (for KM Y) and how much local key 101 is allocated. As a result, for example, by allocating the local key 101 received from the quantum cryptography communication device 10 having a higher generation speed of the local key 101 to the global key random number (for KM Y) more, it is possible to generate the global key 102 efficiently.

Operation Example of Quantum Cryptography Communication Device

Figure 8:
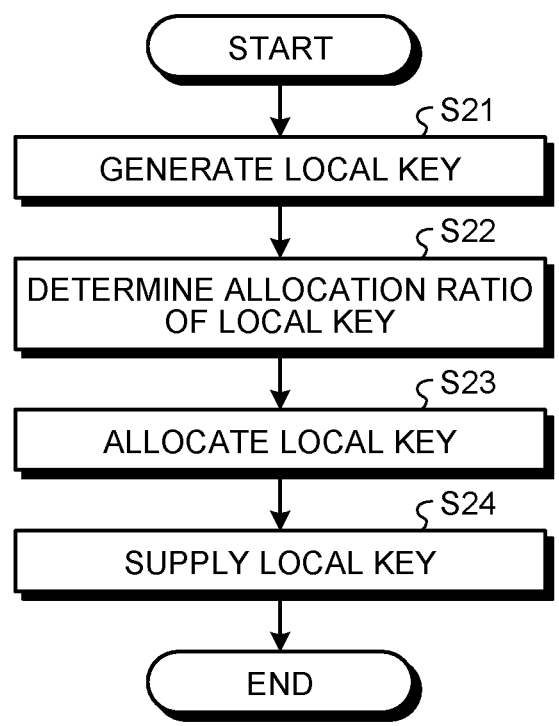
FIG. 8 is a flowchart illustrating an operation example of the quantum cryptography communication device according to the first embodiment.

FIG. 8 is a flowchart illustrating an operation example of the quantum cryptography communication device 10 according to the first embodiment. First, the local key generation unit 12 generates the local key 101 by QKD (step S21).

Next, the determination unit 14 determines the allocation ratio of the local key 101 generated by the processing in step S21 (step S22). The allocation ratio is determined, for example, based on a notification from the key management device (KM) 20. In addition, for example, the allocation ratio is determined by the processing of the determination unit 14 of the quantum cryptography communication device 10 (the ratio may be determined by the quantum cryptography communication device 10 itself).

Next, the allocation unit 15 allocates the local key 101 to the local key 101 for encryption, the local key 101 for decryption, and the global key random number for each communication destination at the ratio determined by the processing in step S22 (step S23).

Next, the local key supply unit 13 supplies the local key 101 for encryption, the local key 101 for decryption, and the local key 101 allocated as the global key random number for each encrypted data communication destination to the KM 20 connected to the quantum cryptography communication device 10 (step S24).

Operation Example of Key Management Device (KM)

Figure 9:
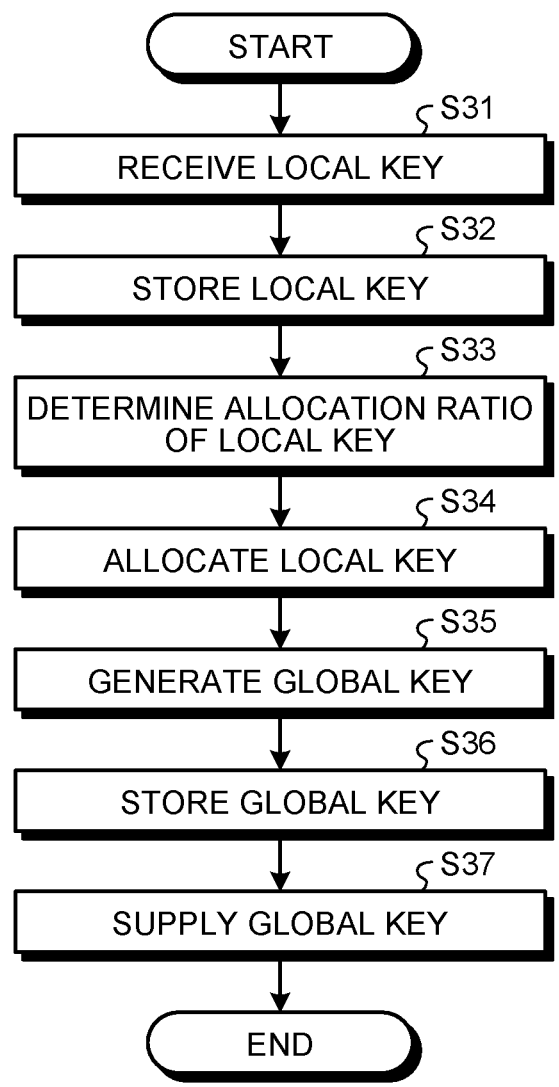
FIG. 9 is a flowchart illustrating an operation example of the key management device according to the first embodiment.

FIG. 9 is a flowchart illustrating an operation example of the key management device (KM) 20 according to the first embodiment. First, the local key reception unit 21 receives the local key 101 from the quantum cryptography communication device 10 (step S31). Next, the storage unit 23 stores the local key 101 received by the processing in step S31 (step S32).

Next, the determination unit 25 determines the allocation ratio of the local key 101 stored by the processing in step S32 (step S33).

Next, the allocation unit 26 allocates the local key 101 to the local key 101 for encryption, the local key 101 for decryption, and the global key random number for each encrypted data communication destination at the ratio determined by the processing in step S33 (step S34).

The global key generation unit 27 generates the global key 102 based on the local key 101 allocated as the global key random number for each encrypted data communication destination (step S35).

Next, the storage unit 23 stores the global key 102 for each encrypted data communication destination generated based on the local key 101 allocated as the global key random number for each encrypted data communication destination by the processing in step S34 (step S36).

Next, the global key supply unit 24 supplies the global key 102 in response to a global key request from an application connected to the key management device (KM) 20 (step S37).

As described above, according to the quantum cryptography communication system 100 of the first embodiment, the quantum cryptography communication device 10 includes the generated information supply unit (in the first embodiment, a local key supply unit 13) that supplies the generated information (in the first embodiment, the local key 101) generated by the quantum key distribution processing to the key management device 20. In the key management device 20, the local key reception unit 21 receives the local key 101 from the quantum cryptography communication device 10. The determination unit 25 determines a ratio at which the local key 101 is used for the local key 101 for encryption, the local key 101 for decryption, and the global key random number for each encrypted data communication destination. Then, the global key supply unit 24 supplies the global key 102 generated from the global key random number to an application connected to the key management device 20.

As a result, according to the quantum cryptography communication system 100 of the first embodiment, it is possible to construct the key sharing network (QKD network) 110 with a more flexible system configuration. Specifically, since the local key 101 shared between the opposite quantum cryptography communication devices 10 is used to generate the global key 102 and the global key 102 can be shared between the nodes 1, even in a system configuration in which the key management device (KM) 20 does not include a random number generator, it is possible to share the global key 102.

In the conventional technology, a random number generator is required for the key management device (KM) 20, but according to the quantum cryptography communication system 100 of the first embodiment, it is not required for the key management device (KM) 20 to include a random number generator, and the entire system configuration is made efficient.

Second Embodiment

Next, a second embodiment will be described. In the description of the second embodiment, a description similar to that of the first embodiment will be omitted, and portions different from those of the first embodiment will be described.

Example of Functional Configuration

Figure 10:
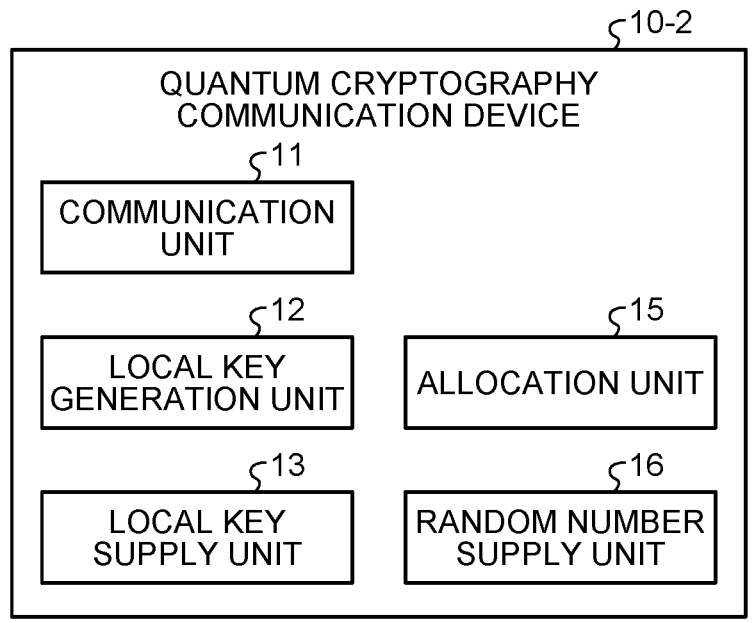
FIG. 10 is a diagram illustrating an example of a functional configuration of a quantum cryptography communication device according to a second embodiment.
Figure 11:
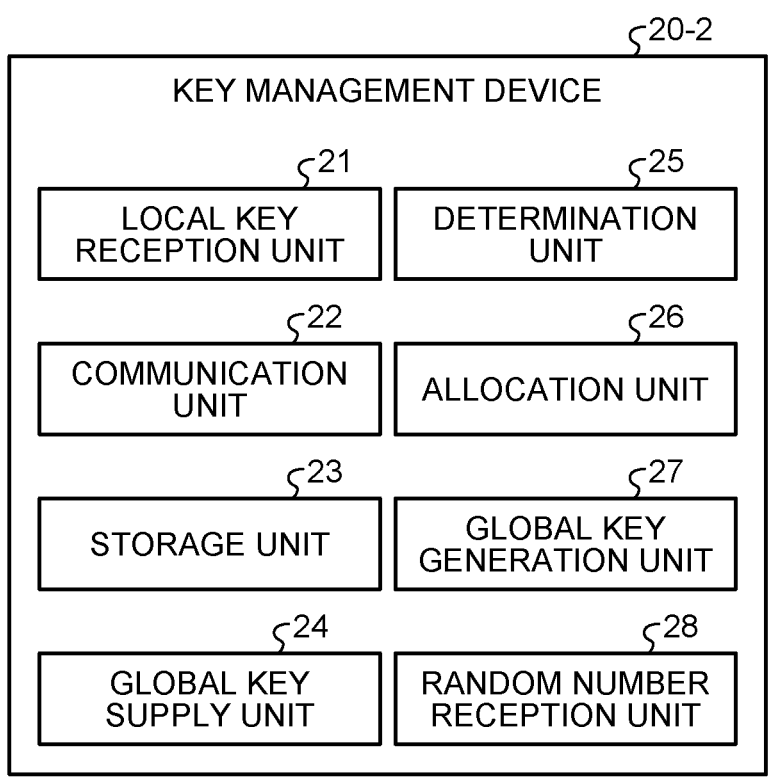
FIG. 11 is a diagram illustrating an example of a functional configuration of a key management device according to the second embodiment.

FIG. 10 is a diagram illustrating an example of a functional configuration of a quantum cryptography communication device 10-2 according to the second embodiment. FIG. 11 is a diagram illustrating an example of a functional configuration of a key management device 20-2 according to the second embodiment.

The node 1 of the second embodiment includes, similar to the first embodiment, a quantum cryptography communication device 10-2 and a key management device (KM) 20-2.

In the quantum key distribution processing of sharing the local key 101 between the quantum cryptography communication devices 10-2 connected by an optical fiber link, a random number (an example of generated information generated in the quantum key distribution processing) may be generated and the random number may be used in the quantum key distribution processing.

In the first embodiment, the local key 101 generated by the quantum cryptography communication device 10 is used for generating the global key 102. However, in the second embodiment, instead, a random number that the quantum cryptography communication device 10-2 holds is used for generating the global key 102.

The quantum cryptography communication device 10-2 of the second embodiment includes a communication unit 11, a local key generation unit 12, a local key supply unit 13, an allocation unit 15, and a random number supply unit 16.

Since the communication unit 11, the local key generation unit 12, and the local key supply unit 13 are similar to those in the first embodiment, the description thereof will be omitted.

The allocation unit 15 allocates the local key 101 to the local key 101 for encryption and the local key 101 for decryption.

The random number supply unit 16 supplies the random number generated by the quantum cryptography communication device 10-2 to the key management device (KM) 20-2.

The key management device (KM) 20-2 according to the second embodiment includes a local key reception unit 21, a communication unit 22, a storage unit 23, a global key supply unit 24, a determination unit 25, an allocation unit 26, a global key generation unit 27, and a random number reception unit 28. Since the communication unit 22, the storage unit 23, and the global key supply unit 24 are similar to those in the first embodiment, the description thereof will be omitted.

The local key reception unit 21 receives the local key 101 from the quantum cryptography communication device 10-2.

The determination unit 25 determines the node 1 with which the global key 102 is shared. Alternatively, the determination unit 25 determines a plurality of nodes 1 with which the global key 102 is shared and determines a ratio of random numbers to be allocated to the generation of the global key 102 shared with each node 1. That is, the determination unit 25 determines a ratio at which the random number is allocated to the global key random number for each encrypted data communication destination.

For example, the determination unit 25 may determine the ratio at which the random number is allocated to the global key random number for each encrypted data communication destination according to the generation speed of random numbers of the quantum cryptography communication device 10-2. When there are the quantum cryptography communication device 10-2 having a high generation speed of random numbers and the quantum cryptography communication device 10-2 having a low generation speed of random numbers, the key management device (KM) 20-2 connected to the quantum cryptography communication device 10-2 having a high generation speed of random numbers can generate more global keys 102. Therefore, the determination unit 25 may share information on the generation speed of random numbers with the opposite node 1 and determine how much global key 102 is generated by the key management device (KM) 20-2 of which node 1.

In addition, for example, in a case where a plurality of quantum cryptography communication devices 10-2 are connected to the key management device 20-2, the determination unit 25 may determine a ratio at which the random number generated by each of the quantum cryptography communication devices 10-2 is allocated to the global key random number for each encrypted data communication destination based on the generation speed of the random numbers generated by each quantum cryptography communication device 10-2. For example, the determination unit 25 may allocate more random numbers of the quantum cryptography communication device 10-2 having a higher generation speed of random numbers to the global key random number for each encrypted data communication destination.

In addition, for example, the determination unit 25 may determine the ratio of the random number to be allocated to the global key random number for each encrypted data communication destination according to a request from an application connected to the key management device (KM) 20-2. The request from the application includes, for example, information such as a generation ratio of the global key 102 for each encrypted data communication destination requested according to the use frequency or the like of the global key 102 for each encrypted data communication destination.

In addition, the determination unit 25 also determines a ratio at which the local key 101 is allocated to the local key for encryption and the local key for decryption.

The allocation unit 26 allocates the random number to the global key random number for each encrypted data communication destination based on the allocation ratio of the random number. In addition, the allocation unit 26 allocates the local key 101 to the local key for encryption and the local key for decryption based on the allocation ratio of the local key 101.

The random number reception unit 28 receives the random number supplied from the quantum cryptography communication device 10-2 and inputs the random number to the global key generation unit 27.

The global key generation unit 27 generates the global key 102 from the random number supplied from the quantum cryptography communication device 10-2.

With the above functional configuration, the quantum cryptography communication device 10-2 of the second embodiment can supply the random number to the KM 20-2. In addition, the KM 20-2 of the second embodiment can receive the random number from the quantum cryptography communication device 10-2.

Example of Method of Generating Global Key

Figure 12:
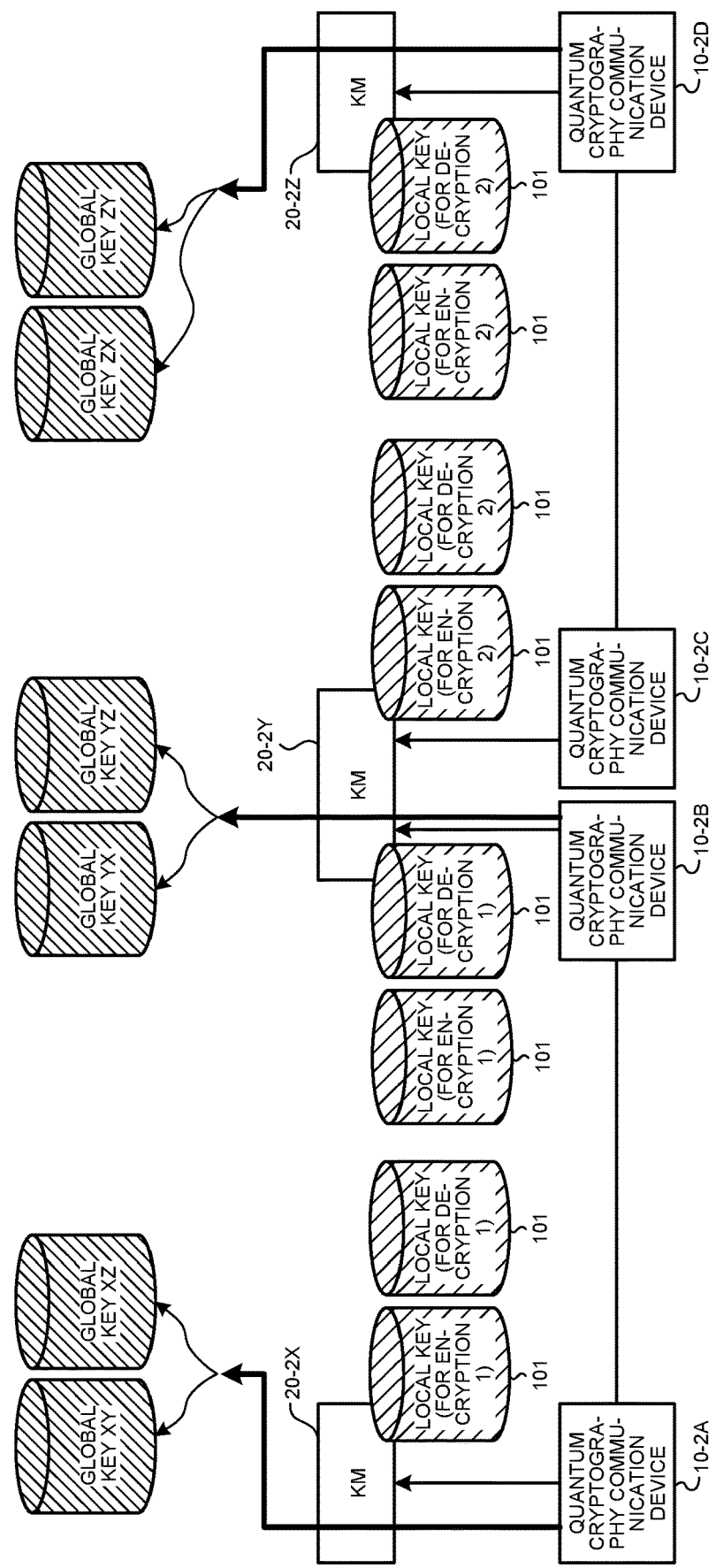
FIG. 12 is a diagram illustrating an example of a method of generating a global key according to the second embodiment.

FIG. 12 is a diagram illustrating an example of a method of generating the global key 102 according to the second embodiment. The local key 101 generated by the quantum cryptography communication device 10-2A is transmitted to the KM 20-2X, and the local key 101 generated by the quantum cryptography communication device 10-2B is transmitted to the KM 20-2Y.

The KM 20-2X allocates the local key 101 received from the quantum cryptography communication device 10-2A to the local key 101 (for encryption 1) and the local key 101 (for decryption 1).

The KM 20-2Y allocates the local key 101 received from the quantum cryptography communication device 10-2B to the local key 101 (for decryption 1) and the local key 101 (for encryption 1).

Similarly, the local key 101 generated by the quantum cryptography communication device 10-2C is transmitted to the KM 20-2Y, and the local key 101 generated by the quantum cryptography communication device 10-2D is transmitted to the KM 20-2Z.

The KM 20-2Y allocates the local key 101 received from the quantum cryptography communication device 10-2C to the local key 101 (for encryption 2) and the local key 101 (for decryption 2).

The KM 20-2Z allocates the local key 101 received from the quantum cryptography communication device 10-2D to the local key 101 (for decryption 2) and the local key 101 (for encryption 2).

The KM 20-2X receives a random number supplied from the quantum cryptography communication device 10-2A and generates a global key XY shared with the KM 20-2Y and a global key XZ shared with the KM 20-2Z.

The KM 20-2X transfers the global key XY generated by the KM 20-2X to the KM 20-2Y by the transfer method in FIG. 6 described above. Furthermore, the KM 20-2X transfers the global key XZ generated by the KM 20-2X to the KM 20-2Z by the transfer method in FIG. 6 described above.

Similarly, the KM 20-2Y receives a random number supplied from the quantum cryptography communication device 10-2B and generates a global key YX shared with the KM 20-2X and a global key YZ shared with the KM 20-2Z. Here, the KM 20-2Y may generate the global keys YX and YZ using a random number supplied from the quantum cryptography communication device 10-2C.

The KM 20-2Y transfers the global key YX generated by the KM 20-2Y to the KM 20-2X by the transfer method in FIG. 6 described above. Furthermore, the KM 20-2Y transfers the global key YZ generated by the KM 20-2Y to the KM 20-2Z by the transfer method in FIG. 6 described above.

Similarly, the KM 20-2Z also receives a random number supplied from the quantum cryptography communication device 10-2D and generates a global key ZX shared with the KM 20-2X and a global key ZY shared with the KM 20-2Y.

The KM 20-2Z transfers the global key ZX generated by the KM 20-2Z to the KM 20-2X by the transfer method in FIG. 6 described above. Furthermore, the KM 20-2Z transfers the global key ZY generated by the KM 20-2Z to the KM 20-2Y by the transfer method in FIG. 6 described above.

As described above, in the second embodiment, the quantum cryptography communication device 10-2 supplies not the local key 101 but the random number generated by the quantum cryptography communication device 10-2 to the key management device (KM) 20-2. Then, the key management device (KM) 20-2 generates the global key 102 using the random number supplied from the quantum cryptography communication device 10-2 and shares the global key 102 among the nodes 1. As a result, even in a system configuration in which the key management device (KM) 20-2 does not include a random number generator, it is possible to share the global key 102.

Note that it is not required for all the key management devices (KM) 20-2 included in the key sharing network (QKD network) 110 to use the scheme of the second embodiment. That is, some key management devices (KM) 20-2 may use the scheme of the first embodiment, and some key management devices (KM) 20-2 may be provided with a random number generator used for generating the global key 102.

Third Embodiment

Next, a third embodiment will be described. In the description of the third embodiment, a description similar to that of the first embodiment will be omitted, and portions different from those of the first embodiment will be described. In the third embodiment, a configuration in which a control device determines an allocation ratio of a local key 101 in a quantum cryptography communication device 10 and a key management device (KM) 20 is different from the first embodiment.

Example of Functional Configuration

Figure 13:
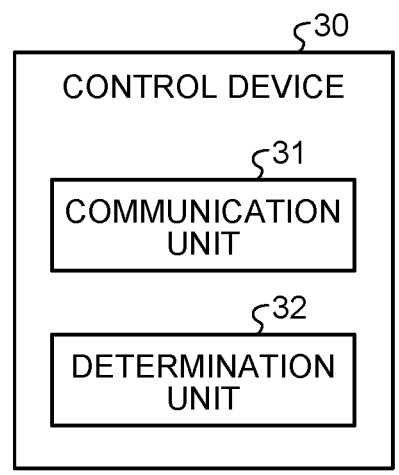
FIG. 13 is a diagram illustrating an example of a functional configuration of a control device according to a third embodiment.

FIG. 13 is a diagram illustrating an example of a functional configuration of a control device 30 according to a third embodiment. The control device 30 of the third embodiment includes a communication unit 31 and a determination unit 32.

The communication unit 31 communicates with the quantum cryptography communication device 10 and the key management device (KM) 20. The communication unit 31 transmits a notification indicating an allocation ratio of the local key 101 to the quantum cryptography communication device 10 and the key management device (KM) 20.

The determination unit 32 determines a ratio at which the local key 101 is allocated to the local key 101 for encryption, the local key 101 for decryption, and the global key random number for each encrypted data communication destination.

Figure 14:
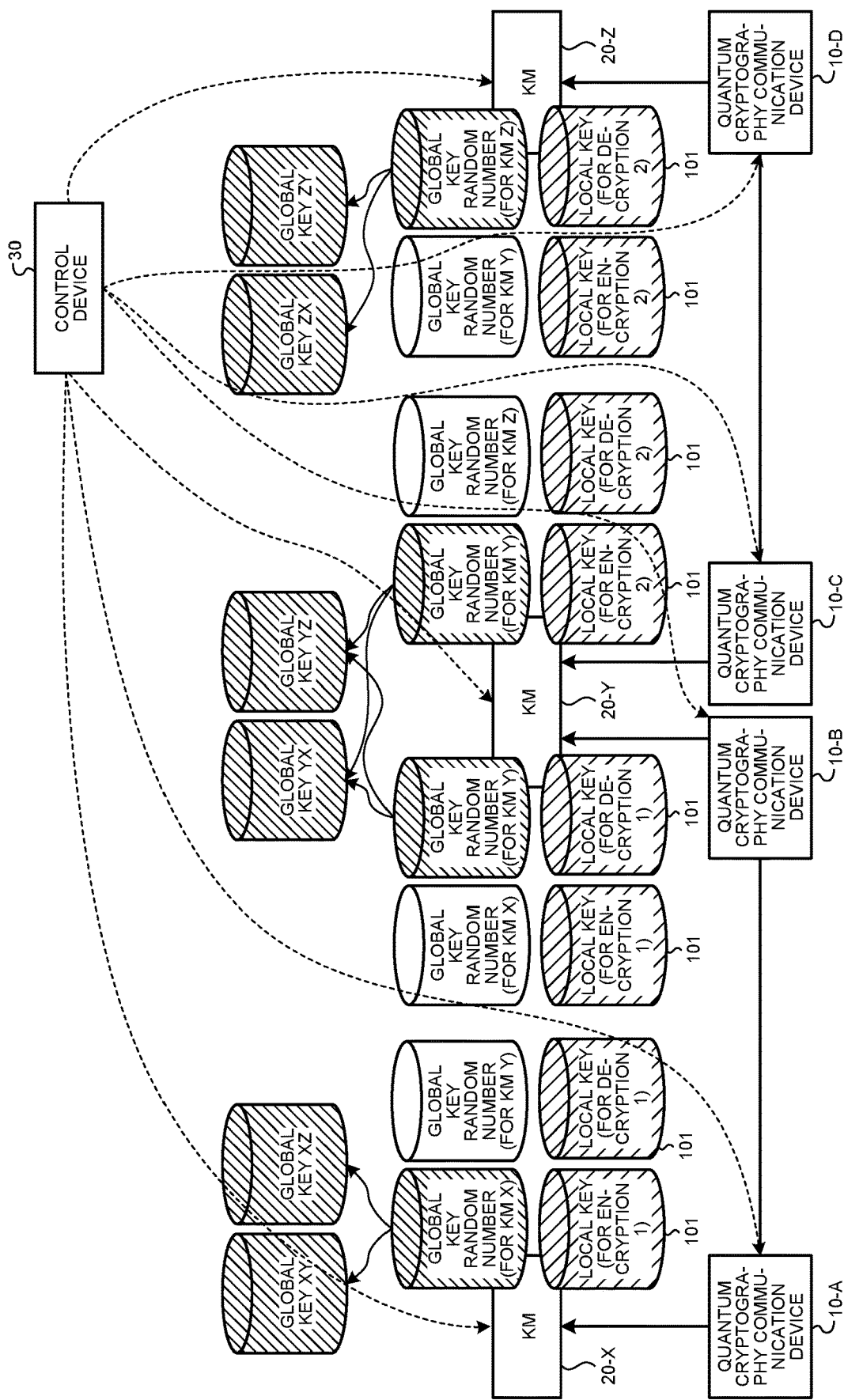
FIG. 14 is a diagram illustrating an example of a method of determining an allocation ratio of a local key according to the third embodiment.

FIG. 14 is a diagram illustrating an example of a method of determining an allocation ratio of a local key according to the third embodiment. In the example of FIG. 14, the control device 30 transmits a notification indicating the allocation ratio of the local key 101 to the quantum cryptography communication devices 10-A to 10-D and the key management devices (KM) 20-X to 20-Z.

According to the third embodiment, the control device 30 can centrally manage the allocation ratio of the local key 101 in each quantum cryptography communication device 10 and each key management device (KM) 20.

Finally, an example of a hardware configuration of the quantum cryptography communication device 10 (10-2) and the key management device 20 (20-2) according to from the first embodiment to the third embodiment will be described.

Example of Hardware Configuration

Figure 15:
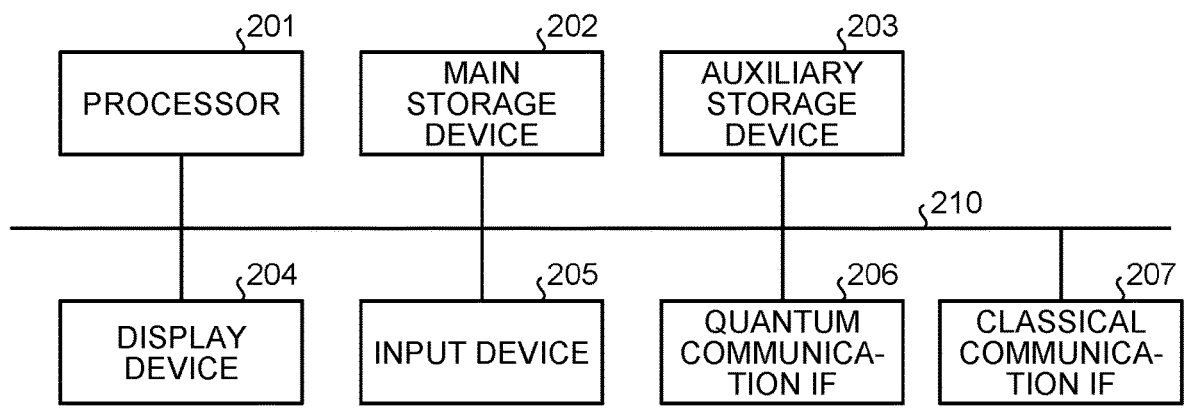
FIG. 15 is a diagram illustrating an example of a hardware configuration of the quantum cryptography communication device according to from the first embodiment to the third embodiment.

FIG. 15 is a diagram illustrating an example of a hardware configuration of the quantum cryptography communication device 10 (10-2) according to from the first embodiment to the third embodiment. The quantum cryptography communication device 10 includes a processor 201, a main storage device 202, an auxiliary storage device 203, a display device 204, an input device 205, a quantum communication IF 206, and a classical communication IF 207. The processor 201, the main storage device 202, the auxiliary storage device 203, the display device 204, the input device 205, the quantum communication IF 206, and the classical communication IF 207 are connected via a bus 210.

The processor 201 executes a program transferred from the auxiliary storage device 203 to the main storage device 202. The main storage device 202 is a memory such as a read-only memory (ROM) and a random access memory (RAM). The auxiliary storage device 203 is a hard disk drive (HDD), a memory card, and the like.

The display device 204 displays the state and the like of the quantum cryptography communication device 10. The input device 205 receives input from a user. Note that the quantum cryptography communication device 10 may not include the display device 204 and the input device 205.

The quantum communication IF 206 is an interface for connecting to a quantum cryptography communication path (optical fiber link). The classical communication IF 207 is an interface for connecting to a QKD control signal communication path, the key management device 20, and the like. In a case where the quantum cryptography communication device 10 does not include the display device 204 and the input device 205, for example, a display function and an input function of an external terminal connected via the classical communication IF 207 may be used.

Figure 16:
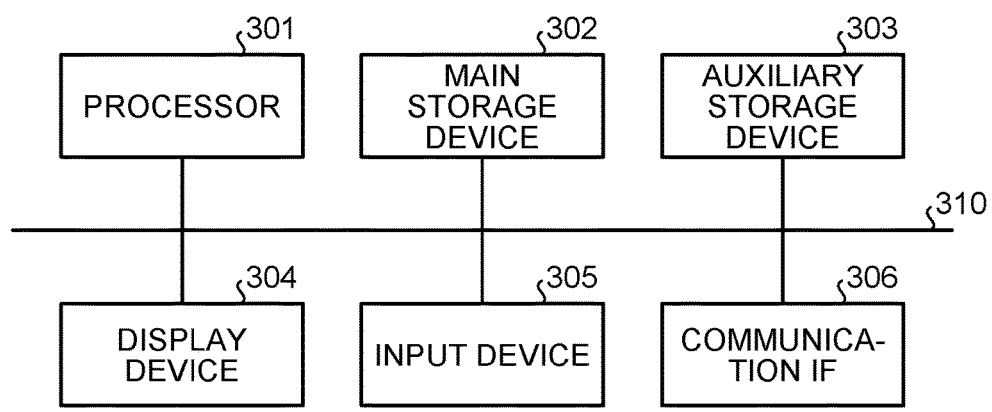
FIG. 16 is a diagram illustrating an example of a hardware configuration of the key management device according to from the first embodiment to the third embodiment.

FIG. 16 is a diagram illustrating an example of a hardware configuration of the key management device 20 (20-2) according to from the first embodiment to the third embodiment. The key management device 20 includes a processor 301, a main storage device 302, an auxiliary storage device 303, a display device 304, an input device 305, and a communication IF 306. The processor 301, the main storage device 302, the auxiliary storage device 303, the display device 304, the input device 305, and the communication IF 306 are connected via a bus 310.

The processor 301 executes a program transferred from the auxiliary storage device 303 to the main storage device 302. The main storage device 302 is a memory such as a ROM and a RAM. The auxiliary storage device 303 is an HDD, a memory card, and the like.

The display device 304 displays the state and the like of the key management device 20. The input device 305 receives input from a user. Note that the key management device 20 may not include the display device 304 and the input device 305.

The communication IF 306 is an interface for connecting to the quantum cryptography communication device 10, the key management device 20, an application, and the like. In a case where the key management device 20 does not include the display device 304 and the input device 305, for example, a display function and an input function of an external terminal connected via the communication IF 306 may be used.

The program executed by the quantum cryptography communication device 10 and the key management device 20 is a file in an installable format or an executable format, is stored in a computer-readable storage medium such as a compact disc read-only memory (CD-ROM), a memory card, a compact disc recordable (CD-R) and a digital versatile disc (DVD), and is provided as a computer program product.

In addition, the program executed by the quantum cryptography communication device 10 and the key management device 20 may be stored on a computer connected to a network such as the Internet and provided by being downloaded via the network.

In addition, the program executed by the quantum cryptography communication device 10 and the key management device 20 may be provided via a network such as the Internet without being downloaded.

In addition, the program executed by the quantum cryptography communication device 10 and the key management device 20 may be provided by being incorporated in a ROM or the like in advance.

The program executed by the quantum cryptography communication device 10 (10-2) has a module configuration including a function that can be realized by the program among the functional configurations of the quantum cryptography communication device 10 (10-2) described above. The processor 201 reads the program from the storage medium such as the auxiliary storage device 203 and executes the program, whereby the function realized by the program is loaded to the main storage device 202. That is, the function realized by the program is generated on the main storage device 202.

In addition, the program executed by the key management device 20 (20-2) has a module configuration including a function that can be realized by the program among the functional configurations of the key management device 20 (20-2) described above. The processor 301 reads the program from the storage medium such as the auxiliary storage device 303 and executes the program, whereby the function realized by the program is loaded to the main storage device 302. That is, the function realized by the program is generated on the main storage device 302.

Note that some or all of the functions of the quantum cryptography communication device 10 and the key management device 20 may be realized by hardware such as an integrated circuit (IC). The IC is, for example, a processor that executes dedicated processing.

In addition, in a case where functions are realized by using a plurality of processors, each processor may realize one of the functions or may realize two or more of the functions.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A quantum cryptography communication system including a quantum cryptography communication device and a key management device,
the quantum cryptography communication system comprising one or more hardware processors configured to:
supply generated information generated by quantum key distribution processing, to the key management device;
receive the generated information from the quantum cryptography communication device;

determine a ratio at which the generated information is used for a global key random number for each destination device receiving encrypted data; and supply a global key generated from the global key random number to an application connected to the key management device, wherein the generated information is a local key shared with an opposite quantum cryptography communication device by the quantum key distribution processing; and the one or more hardware processors are further configured to:

determine ratios at which the local key is allocated to a local key for encryption, a local key for decryption, and the global key random number for each destination device receiving the encrypted data; and allocate the local key to the local key for encryption, the local key for decryption, and the global key random number for each destination device receiving the encrypted data, based on the ratios.

2. The system according to claim 1, wherein the key management device further includes a communication interface configured to transmit the global key encrypted by using the local key for encryption to the opposite key management device when transmitting the global key to the opposite key management device, and decrypt the global key by using the local key for decryption when receiving the global key being encrypted from the opposite key management device.

3. The system according to claim 1, wherein the quantum cryptography communication device includes a plurality of quantum cryptography communication devices, the key management device is connected to the plurality of quantum cryptography communication devices, and the one or more hardware processors are configured to determine a ratio at which the local key generated by each quantum cryptography communication device is allocated to the global key random number for the destination device receiving encrypted data, based on generation speeds of local keys generated by the plurality of quantum cryptography communication devices.

4. The system according to claim 1, wherein the one or more hardware processors determine a ratio at which the local key is allocated to the global key random number for each destination device receiving encrypted data according to a request from the application.

5. A quantum cryptography communication system including a quantum cryptography communication device and a key management device, the quantum cryptography communication system comprising one or more hardware processors configured to:

supply generated information generated by quantum key distribution processing, to the key management device;

receive the generated information from the quantum cryptography communication device;

determine a ratio at which the generated information is used for a global key random number for each destination device receiving encrypted data; and supply a global key generated from the global key random number to an application connected to the key management device, wherein the generated information is a random number generated by the quantum key distribution processing, the one or more hardware processors are configured to:

determine a ratio at which the random number is allocated to the global key random number for each destination device receiving the encrypted data;

allocate the random number to the global key random number for each destination device receiving the encrypted data based on the ratio; and determine ratios at which a local key shared with an opposite quantum cryptography communication device by the quantum key distribution processing is allocated to a local key for encryption and a local key for decryption, and the quantum cryptography communication system further includes a communication interface configured to transmit the global key encrypted by using the local key for encryption to an opposite key management device when transmitting the global key to the opposite key management device, and decrypt the global key by using the local key for decryption when receiving the global key being encrypted from the opposite key management device.

6. The system according to claim 5, wherein the one or more hardware processors determine a ratio at which the random number is allocated to the global key random number for each destination device receiving the encrypted data according to a request from the application.

7. A quantum cryptography communication system including a quantum cryptography communication device and a key management device, the quantum cryptography communication system comprising one or more hardware processors configured to:

supply generated information generated by quantum key distribution processing, to the key management device;

receive the generated information from the quantum cryptography communication device;

determine a ratio at which the generated information is used for a global key random number for each destination device receiving encrypted data; and supply a global key generated from the global key random number to an application connected to the key management device, wherein the generated information is a random number generated by the quantum key distribution processing, the one or more hardware processors are configured to:

determine a ratio at which the random number is allocated to the global key random number for each destination device receiving the encrypted data; and allocate the random number to the global key random number for each destination device receiving the encrypted data based on the ratio, the quantum cryptography communication device includes a plurality of quantum cryptography communication devices, the key management device is connected to the plurality of the quantum cryptography communication devices, and the one or more hardware processors are configured to determine a ratio at which a random number generated by each quantum cryptography communication device is allocated to a global key random number for each destination device receiving the encrypted data, based on generation speeds of random numbers generated by the plurality of quantum cryptography communication devices.

8. A computer program product comprising a non-transitory computer-readable medium including programmed instructions stored thereon, wherein the instructions, when executed by a computer of a key management device, cause the computer to:
receive generated information generated by quantum key distribution processing from a quantum cryptography communication device;
determine a ratio at which the generated information is used for a global key random number for each destination device receiving encrypted data; and
supply a global key generated from the global key random number to an application connected to the key management device,
wherein
the generated information is a local key shared with an opposite quantum cryptography communication device by the quantum key distribution processing,
the instructions cause the computer to:
determine ratios at which the local key is allocated to a local key for encryption, a local key for decryption, and the global key random number for each destination device receiving the encrypted data; and
allocate the local key to the local key for encryption, the local key for decryption, and the global key random number for each destination device receiving the encrypted data, based on the ratios.

9. A computer program product comprising a non-transitory computer-readable medium including programmed instructions stored thereon, wherein the instructions, when executed by a computer of a key management device, cause the computer to:
receive generated information generated by quantum key distribution processing from a quantum cryptography communication device;
configured to determine a ratio at which the generated information is used for a global key random number for each destination device receiving encrypted data; and
configured to supply a global key generated from the global key random number to an application connected to the key management device,
wherein
the generated information is a random number generated by the quantum key distribution processing, and
the instructions further cause the computer to:
determine a ratio at which the random number is allocated to the global key random number for each destination device receiving the encrypted data;
allocate the random number to the global key random number for each destination device receiving the encrypted data based on the ratio;
determine ratios at which a local key shared with an opposite quantum cryptography communication device by the quantum key distribution processing is allocated to a local key for encryption and a local key for decryption; and
transmit the global key encrypted by using the local key for encryption to an opposite key management device when transmitting the global key to the opposite key management device, and decrypt the global key by using the local key for decryption when receiving the global key being encrypted from the opposite key management device.

10. A computer program product comprising a non-transitory computer-readable medium including programmed instructions stored thereon, wherein the instructions, when executed by a computer of a key management device, cause the computer to:
receive generated information generated by quantum key distribution processing from a quantum cryptography communication device;
determine a ratio at which the generated information is used for a global key random number for each destination device receiving encrypted data; and
supply a global key generated from the global key random number to an application connected to the key management device,
wherein
the generated information is a random number generated by the quantum key distribution processing,
the instructions further cause the computer to:
determine a ratio at which the random number is allocated to the global key random number for each destination device receiving the encrypted data, and
allocate the random number to the global key random number for each destination device receiving the encrypted data based on the ratio,
the quantum cryptography communication device includes a plurality of quantum cryptography communication devices,
the key management device is connected to the plurality of the quantum cryptography communication devices, and
the instructions further cause the computer to determine a ratio at which a random number generated by each quantum cryptography communication device is allocated to a global key random number for each destination device receiving the encrypted data, based on generation speeds of random numbers generated by the plurality of quantum cryptography communication devices.

* * * * *